May 25, 1965     G. L. MITTELSTEADT     3,185,235

FILAMENT FULCRUM MECHANISM

Filed March 13, 1963

INVENTOR.
GLEN L. MITTELSTEADT
BY
Williamson & Palmatier
ATTORNEYS

United States Patent Office 3,185,235
Patented May 25, 1965

---

3,185,235
FILAMENT FULCRUM MECHANISM
Glen L. Mittelsteadt, Waseca, Minn., assignor to Herter's Inc., Waseca, Minn., a corporation of Minnesota
Filed Mar. 13, 1963, Ser. No. 264,941
6 Claims. (Cl. 177—246)

This invention relates to a scale device and more particularly to a novel filament type fulcrum mechanism for the balance beam lever of a scale device.

An object of this invention is the provision in a scale device of a novel filament type fulcrum mechanism, of simple and inexpenisve construction which pivotally supports and cooperates with the balance beam lever to permit highly sensitive and accurate weight determining operation to be performed.

Another object of this invention is to provide a scale device with a novel and improved fulcrum mechanism comprising a tensioned filament, preferably of fine metallic construction, upon which the balance beam lever is balanced during the weighing operation thereby rendering the beam lever extremely sensitive to weight changes and permitting highly effective and accurate weighing.

A further object of this invention is the provision of a filament type fulcrum mechanism of the class described which is adaptable for inclusion into conventional scale devices such as those used for weighing material such as gun powder and the like.

These and other objects and advantages of my invention will more fully appear from the following description made in connection with the accompanying drawings wherein like character references refer to the same or similar parts throughout the several views, and in which.

Figure 1:
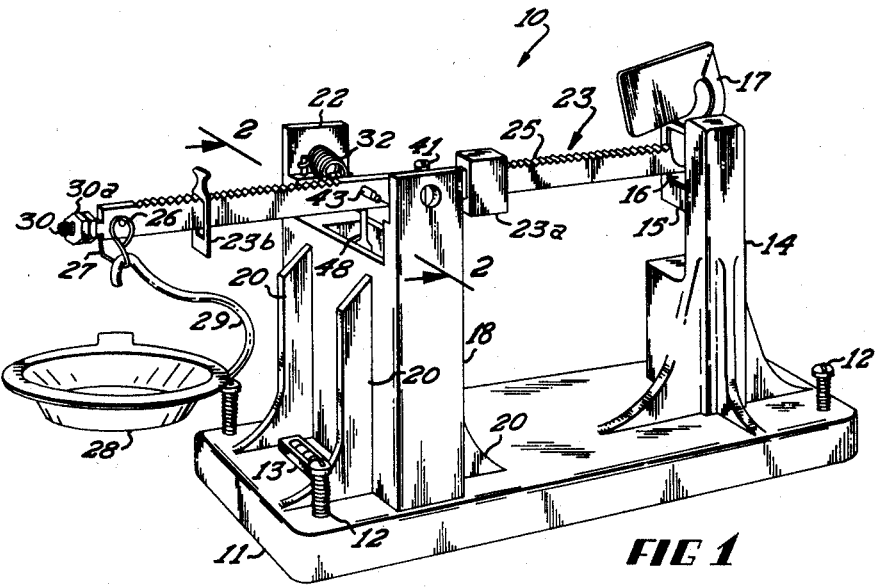
FIG. 1 is a perspective view of a scale device incorporating my invention.

Referring now to the drawings and more specifically to FIG. 1 it will be seen that a scale device, of the type used in measuring gun powder for firearms used in hunting, and designated in its entirety by the reference numeral 10, is there shown. This scale device 10 includes a base 11 of generally rectangular configuration and preferably formed from a cast metallic material such as iron or the like. A plurality of vertically adjustable leg elements 12 in the form of bolts threadedly engage suitable threaded apertures in the base 11 and project therethrough. The lower ends of these leg elements 12 have foot elements 12a secured thereto, the latter serving to engage the surface upon which the scale device 10 is supported. It is pointed out that four such leg elements 12 are provided and these legs permit leveling of the scale device when the latter is positioned upon an irregular or unlevel surface. A level indicator 13 is secured to the base frame adjacent one end thereof and serves to facilitate leveling of the scale device during adjustment of the leg elements 12.

Referring again to FIG. 1 it will be seen that a support member 14 is integrally formed with the base 11 adjacent one end thereof and projects upwardly therefrom. This support member 14 is provided with a beam guide and retaining plate 15 preferably constructed of a suitable metallic material secured to the support member 14 by any suitable securing means such as bolts or the like. This beam guide and retaining plate 15 is of the type incorporated in my scale device disclosed and claimed in my co-pending application, Serial No. 173,792, filed February 16, 1962, now Patent No. 3,121,466. It will be noted that the beam guide and retaining plate 15 is provided with an elongate generally vertically disposed rectangular aperture 16 therein through which the balance beam lever of the scale device projects. It is pointed out that the beam guide and retaining plate 15 wil be provide with a vertically disposed calibrated scale having suitable indicia to represent the point at which the scale beam will be in weight balancing relation in the manner of the scale device illustrated in my co-pending application.

Means are also provided for stabilizing the balance beam lever and to this end a beam stabilizing mechanism designated generally by the reference numeral 17 is pivotally mounted on the support member 14. This stabilizer mechanism is of substantially identical construction of the type described and claimed in my co-pending application Serial No. 173,792, filed February 16, 1962. It is pointed out that this stabilizer mechanism is provided with a V-shaped socket portion which is engageable with the pointer of the balance beam lever to position the pointer element of the lever in a weight balanced position. Since the particular construction of the stabilizer mechanism 17 is of substantially identical construction to that found in my co-pending application, Serial No. 173,792, now Patent No. 3,121,466, it is felt that a detailed illustration of this mechanism is unnecessary for the instant application. It is also pointed out that this stabilizer mechanism 17 does not, per se, constitute an essential element of my invention disclosed in this application.

The base 11 also has another support member 18 rigidly affixed to one end thereof and projecting upwardly therefrom. It will be seen that the upper end portion of the support member 18 is bifurcated to define a pair of beam lever supporting elements 19. The support member 18 is of generally rectangular construction and is provided with suitable reinforcing or stiffening rib members 20. The central upper portion of the support member 18 is provided with an upwardly opening recess or receptacle 21 which preferably contains a suitable liquid such as oil or the like. The oil or other liquid disposed in the recess or receptacle 21 serves to dampen oscillating movement of the balance beam lever in a manner to be described hereinbelow.

The balance beam lever supporting elements 19 are provided with upwardly extending projections 22 each of which has its outer lateral surface coextensive with the exterior surface of its associated beam lever supporting element.

It will be seen that the scale device 10 includes an elongate generally horizontally oriented balance beam lever 23 which is supported from the beam lever supporting elements 19 by a novel fulcrum mechanism 24. The upper longitudinal edge 25 of the balance beam lever 23 is serrated while the lower edge thereof is substantially straight and smooth. The end portion of the balance beam lever 23 which projects through the opening 16 in the beam guide and retaining plate 15 defines a pointer (not shown), the pointer cooperating with the indicia on the plate 15 to indicate when the balance beam 23 is in a balanced condition during the weighing operation.

The opposite end of the balance beam 23 has a pair of laterally projecting lugs 26 affixed thereto, the latter serving to loosely accommodate a hanger element 27. The weighing pan 28 is suspended from the hanger element 27 by means of a pan supporting suspension structure 29 which is preferably of suitable metallic wire construction. Although not shown in the drawings, it is pointed out that the lower end portion of this suspension structure 29 is bent to define an annular ring for receiving and supporting the weighing pan 28 therein. It will also be noted that the upper end portion of the suspension structure 29 is also arcuately bent to define a hook which releasably engages the hanger element 27. The pan suspending end portion of the balance beam lever 23 is also provided with an elongate axially extending threaded element 30 which threadedly accommodates a pair of nuts 30a, the nuts being adjustable relative to the threaded element 30 to permit adjustment of the lever arm in a well known manner. The balance beam lever 23 is also provided with a relatively large weight element 23a which is slidable along the beam lever during the weighing operation. This large weight element will be retained in a selected position along the length of the balance beam lever 23 by the serrated upper edge 25. The smaller weight element 23b is also slidably mounted on the balance beam lever but is positioned between the support member 18 and the end of the balance beam lever which supports the weighing pan 27.

Figure 2:
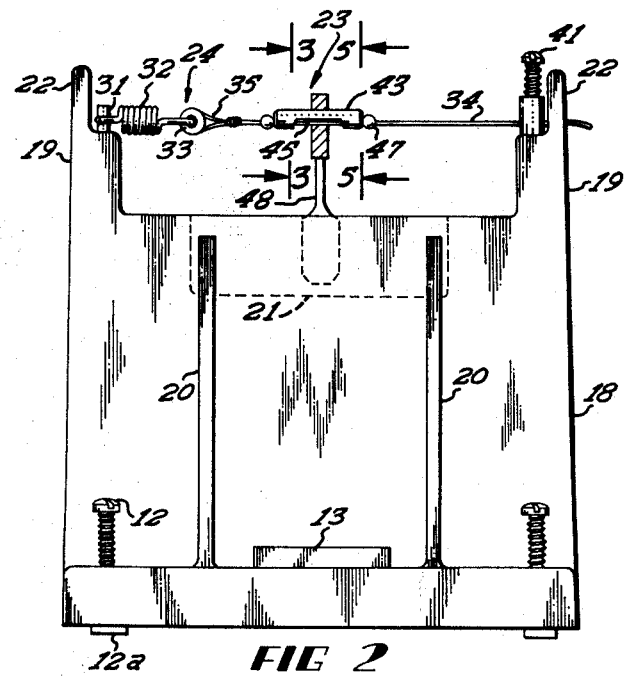
FIG. 2 is a transverse cross-sectional view taken approximately along line 2—2 of FIG. 1 and looking in the direction of the arrows.

The fulcrum mechanism 24 extends between and is detachably connected with the beam lever supporting elements 19. To this end, it will be seen that one of the balance beam lever supporting elements 19 is provided with upstanding atthachment post or pin 31 as best seen in FIG. 2. A small helical spring 32 has one hooked end thereof releasably engaging the pin 31 and has its other hooked end projecting through a small sleeve element 33. An elongate filament 34 preferably formed of metallic wire construction has a loop 35 formed at one end, this loop 35 embracing the sleeve 33.

The other end of the filament 34 is releasably secured to a clamping mechanism carried by the other balance beam lever supporting element 19. It will be seen that this clamping mechanism includes a clamping post 36 having an upwardly opening threaded aperture 37 therein. The post 36 is pressed into an upwardly opening recess 38 formed in the beam lever supporting element 19. It will be seen that the clamping post 36 has a transverse opening 39 extending therethrough which communicates with the threaded aperture or recess 37. The clamped end of the filament 34 extends through this transverse opening 39 and is clamped between a pair of metallic clamping elements 40, the latter being urged into clamped relation with respect to the filament 34 by a clamping bolt 41. It will be noted that the clamping elements 40 are arranged in upper and lower relationship, the lower of which is positioned in the bottom of the recess 37 and the upper clamping element being urged against the filament when the clamping bolt 40 is screwed downwardly into the threaded recess 37. The upwardly extending projection 22 of the beam lever supporting element 19 associated with the clamping mechanism has an aperture or opening 42 therein through which the filament 34 projects.

Figure 3:
FIG. 3 is a vertical sectional view on an enlarged scale taken approximately along line 3—3 of FIG. 2 and looking in the direction of the arrows.
Figure 4:
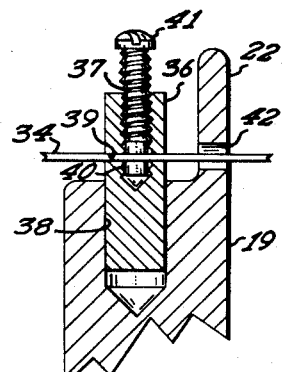
FIG. 4 is a fragmentary detailed sectional view on an enlarged scale of the filament clamping means illustrated on the upper right portion of the device as viewed in FIG. 2.

It will therefore be seen that the filament 34 actually constitutes a fulcrum upon which the balance beam lever 23 oscillates. In order to assure effective mounting of the balance beam lever 23 on the filament 34, it will be seen that the balance beam lever is provided with a filament engaging element 43 which as best seen in FIGS. 2 and 3, is pressed into an aperture 44 formed in the balance beam lever, the filament engaging element projecting laterally from opposite sides of the balance beam lever. It will be noted that the filament engaging element 43 is centrally relieved as at 45 thereby defining a recess or passage with the aperture 44 to permit the wire filament 34 to pass freely therethrough. The recess or passage defined by the relieved central portion 45 of the filament engaging element 43 and the aperture 44 in the balance beam engaging lever is of a size to very freely and loosely accommodate the filament 34.

Figure 5:
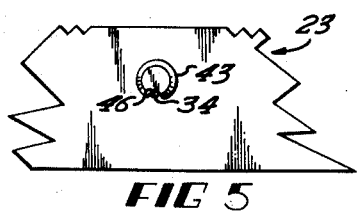
FIG. 5 is a vertical cross-sectional view on an enlarged scale taken approximately along line 5—5 of FIG. 2 and looking in the direction of the arrows.

Referring now to FIG. 5 it will be seen that opposite ends of the filament engaging element 43 are provided with downwardly facing channel-shaped grooves 46 which receive the filament 34 therein. Thus it will be seen that only these grooved end portions of the filament engaging element 43 engage the filament 34 and constitute the pivotal bearing surface of the balance beam lever 23 with respect to the fulcrum defined by the filament 34. In order to prevent lateral displacement of the balance beam lever 23 with respect to the filament 34, the latter is provided with a pair of positioning elements 47 preferably constructed of metal and secured to the filament 34 in close proximity to opposite ends of the filament engaging element 43. Thus the filament engaging element 43 cooperates with these positioning elements 47 to properly center and position the balance beam lever 23 with respect to the filament 34. The balance beam lever 23 is also provided with a paddle element 48 which rigidly is affixed to the beam lever and depends therefrom below the filament engaging element 43. It will be seen that the paddle element 48 extends into the liquid containing receptacle 21. Thus when the paddle element 48 is caused to oscillate during the weighing operation, the resistance of movement of the paddle element through the liquid serves to dampen and retard this oscillating movement of the balancing lever.

It will be seen that during the weighing operation, the balance beam lever 23 will be supported upon the filament 34 whereby this filament actually constitutes a fulcrum. It is pointed out that it is necessary to maintain the filament 34 under predetermined tension whereby the filament will not sag during the weighing operation. To this end it is pointed out that the helical spring 32 serves as a means for exerting a predetermined tension on the filament 34. To adjust the tension on the filament 34, it is only necessary to retract the clamping bolt 41 from its clamped relation with respect to the upper clamping element 40 and to thereafter merely grip and pull the end of the filament projecting through the aperture or opening 42.

Pivotally supporting the balance beam lever 23 upon the filament 34, an extremely fine and weight sensitive lever fulcrum structure is provided. With this arrangement, the balance beam lever will be very effectively and quickly responsive to very slight changes in weight thereby permitting accurate and precise weighing. It will be appreciated that such precision of weighing and measuring is necessary during a reloading operation wherein a predetermined amount of an explosive is used for each round that is loaded. Since this charge of the explosive must be extremely accurately determined, the fulcrum mechanism 24 is especially adaptable for scale devices used to measure powder in a reloading operation. The positioning elements 47 cooperate with the filament engaging element 43 to properly and effectively position and center the balance beam lever 23. It will be seen that the fulcrum mechanism 24 may be incorporated in conventional scale mechanisms of the type having a horizontally oriented balance beam lever such as that used in the scale device illustrated.

From the foregoing it will be seen that I have provided a novel fulcrum mechanism for a scale device and including a filament upon which the balance beam lever is pivotally supported and which cooperates with the latter to permit highly accurate weighing.

It will also be seen from the preceding paragraphs that my novel highly sensitive, filament type fulcrum mechanism is readily adaptable for use with a conventional scale device and serves to render the same much more sensitive and capable of precision weighing than the conventional knife edge fulcrum structures.

Thus it will be seen that I have provided a scale device having a novel filament type fulcrum mechanism which is not only of simple and inexpensive construction but one which functions in a more efficient manner than any heretofore known comparable devices.

It will of course be understood that various changes may be made in the form, details, arrangement and proportions of the various parts without departing from the scope of my invention.

What is claimed is:
1. In a scale device comprising a base,
a pair of laterally spaced apart beam lever supporting elements rigidly connected with said base and projecting upwardly therefrom,
means defining a beam lever fulcrum including an elongate, tensioned filament extending between and being detachably connected with said beam lever supporting elements,
filament tensioning means for variously adjusting the tension on said filament,
an elongate horizontally oriented balance beam lever having an opening therethrough intermediate its ends, said filament extending loosely through said opening for pivotally supporting said lever intermediate its ends on the filament for vertical pivoting movement thereof about an axis extending transversely of the beam lever,
and cooperating interengaging positioning elements on said beam lever and filament respectively for preventing lateral movement of the beam lever along said filament.
2. The structure as defined in claim 1 wherein said filament tensioning means includes a spring element interconnecting one end of the filament with one of said lever supporting elements.
3. In a scale device comprising a base,
a pair of laterally spaced apart beam lever supporting elements rigidly connected with said base and projecting upwardly therefrom,
means defining a beam lever fulcrum comprising an elongate, tensioned filament extending between and being detachably connected with said beam lever supporting elements,
an elongate, horizontally oriented balance beam lever having a fulcrum engaging element affixed thereto and projecting laterally therefrom, said fulcrum engaging element having a downwardly facing groove therein engaging the filament to pivotally support the balance beam lever intermediate its ends upon the filament for vertical pivoting movement about an axis extending transversely of the beam lever.
4. The structure as defined in claim 3 and a pair of positioning elements on said filament cooperatively engaging said filament engaging element of said beam lever to prevent lateral movement of the beam lever along said filament.
5. In a scale device comprising a base,
a pair of laterally spaced apart beam lever supporting elements rigidly connected with said base and projecting upwardly therefrom,
means defining a beam lever fulcrum including an elongate, tensioned filament extending between and being detachably connected with said beam lever supporting elements,
adjustable tensioning means connected with said filament and being variously adjustable to adjust the tension on said filament,
an elongate, horizontally oriented balance beam lever having a filament engaging element affixed thereto and projecting laterally from opposite sides thereof intermediate the ends of the lever, said filament engaging element having a downwardly facing groove therein engaging the filament to pivotally support the lever for vertical pivoting movement about an axis extending transversely of the beam lever,
and positioning elements on said filament cooperatively engaging said filament engaging element to prevent lateral movement of the beam lever along said filament.
6. In a scale device comprising a base,
a pair of laterally spaced apart beam lever supporting elements rigidly connected with said base and projecting upwardly therefrom,
means defining a beam lever fulcrum comprising an elongate tensioned filament extending between and being detachably connected with said beam lever supporting elements,
an elongate, horizontally oriented balance beam lever having intermediate its ends a transversely extending aperture therein through which said filament passes, said opening being of a cross sectional size slightly larger than the cross sectional size of said filament whereby said balance beam lever is loosely supported on the filament for vertical pivoting movement relative thereto,
and cooperating interengaging positioning elements on said beam lever and filament respectively for preventing lateral movement of the beam lever along said filament.

References Cited by the Examiner
UNITED STATES PATENTS

| 299,761 | 6/84 | Du Brul. | |
| 2,124,968 | 7/38 | Ahrndt | 177—264 |
| 2,368,905 | 2/45 | Wallace | 308—2 |
| 2,484,821 | 10/49 | Glenny | 308—2 |
| 2,574,395 | 11/51 | Jack et al. | 177—264 X |
| 3,027,955 | 4/62 | McCowan | 177—246 |
| 3,106,977 | 10/63 | Wells | 177—246 |

LEO SMILOW, *Primary Examiner.*